Oct. 13, 1936.    J. T. H. DEMPSTER    2,057,560
COMBUSTION ENGINE PISTON AND THE LIKE
Filed June 1, 1934
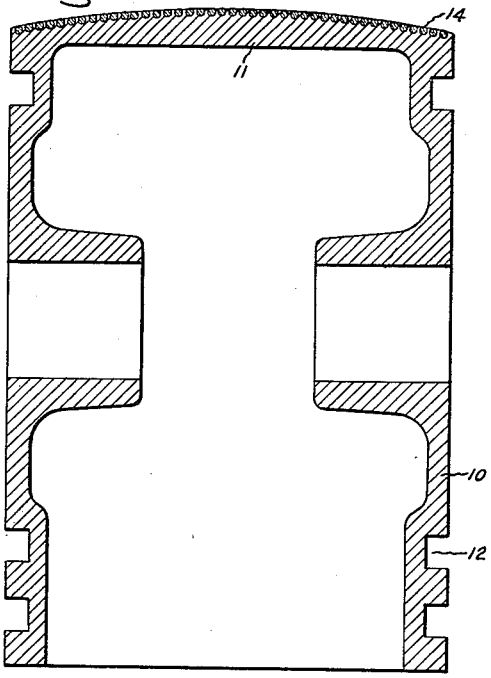
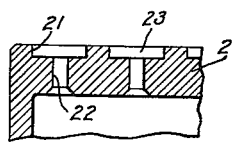
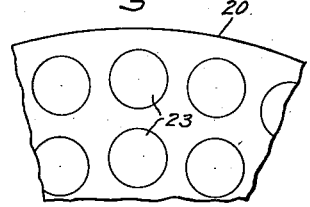
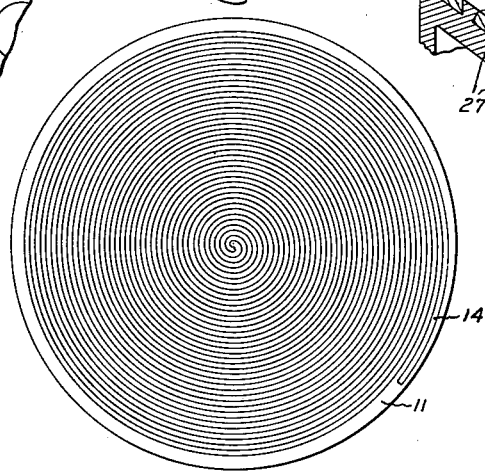
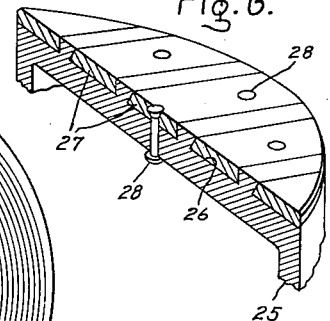
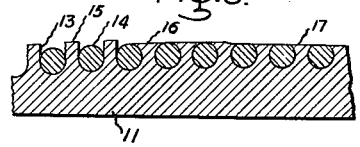
Inventor:
John T. H. Dempster,
by Harry E. Dunham
His Attorney

UNITED STATES PATENT OFFICE 2,057,560

COMBUSTION ENGINE PISTON AND THE LIKE

John T. H. Dempster, Schenectady, N. Y., assignor to General Electric Company, a corporation of New York Application June 1, 1934, Serial No. 728,476

5 Claims. (Cl. 309—9)

The present invention relates to combustion engine pistons and like machine elements having a portion subject to heat, oxidation and corrosion. The effects due to heat, corrosion and oxidation are especially apparent in machine elements such as airplane engine pistons made of light alloys, for example magnesium-aluminum-silicon bronzes.

The general object of my invention is to provide an improved machine element subject to heat during operation whereby the corrosion effect of heat on the machine element is considerably reduced. This is accomplished, according to my invention, by the provision of strip material of high resistance to heat, corrosion and oxidation in a grooved surface of the machine element.

For a better understanding of what I consider to be novel and my invention, attention is directed to the following description and the claims appended thereto, in connection with the accompanying drawing which forms a part of my specification.

In the drawing, Fig. 1 represents a piston embodying my invention; Fig. 2 is a plan view of the piston; Fig. 3 represents a portion of the piston head in its different stages of manufacture; Fig. 4 shows a modification of my invention; Fig. 5 is a plan view of Fig. 4; and Fig. 6 is a perspective view of another modification of my invention.

The piston has a cylindrical wall 10 and a head 11. An intermediate portion of the wall 10 is provided with hubs for receiving a piston pin and the outer surface of the wall 10 has grooves 12 for accommodating packing rings.

The outer surface of the piston head 11, that is, its face, which during operation faces the combustion space and is exposed to the heat produced in said space, is provided, in accordance with my invention, with strip material of high resistance to heat, corrosion and oxidation. The strip material is securely held in grooves in the face of the piston head. The grooves may be arranged in any desirable manner. In the present instance a spiral groove 13 is cut into the face of the piston. As stated above, the piston itself may be made of light material such as an alloy of magnesium, aluminum and silicon, which alloy has a comparatively low resistance to corrosion and oxidation at high temperature. The strip may be made of steel or any desirable corrosion-resistant material, such as chrome nickel steel. A strip in the present instance in the form of a wire 14 is wound into the spiral groove 13. The wire after being seated in a winding operation is pressed firmly down into the groove as shown at the left-hand side of Fig. 3. The protruding spiral edge 15 between adjacent groove portions is rounded or peened over by a follower tool to securely hold the wire in its position, as indicated at 16 in Fig. 3. After the wire is thus securely fastened to the grooved piston face, this face may be skimmed over with a cleaning-up tool to form a smooth surface as indicated at 17 in Fig. 3. With this arrangement a considerable part of the area of the piston face is formed by high-resistant material, the relative area depending upon the width of the groove or grooves, the distance between adjacent groove portions and the shape of the cross section of the strip material. The arrangement can be made so that up to 85% of the surface to be protected is formed of high heat-resistant material.

From another viewpoint, my invention comprises an improved method of protecting machine elements against corrosion at high temperature, according to which method a groove is cut into the surface of the element to be protected and a strip of material with high resistance to heat is embedded or wound into the groove. The arrangement and method according to my invention has the advantage that it needs only a comparatively small amount of high heat-resisting material to protect a machine element. No consideration need be paid to the difference of the coefficients of expansion between the material of the machine element to be protected and the strip material. This is especially true where a continuous strip is wound spirally in a grooved surface. If a part of a turn or even an entire turn should loosen, this turn will be held by the other turns and even if the entire spiral should become detached from a piston, it could not effect cracking of the cylinder because of its elastic, spring-like property.

The arrangement of Figs. 4 and 5 comprises a piston head 20 which has a plurality of annular recesses 21 in its face and bores 22 in concentric arrangement with the recesses. The piston 20 may be of any desirable alloy, such as those mentioned above. The recesses and bores are filled with a material 23 of high heat resistivity, such as steel. The material is anchored in the flared ends 24 of the bores 22.

In the perspective view of Fig. 6, I have shown a piston 25 with a plurality of dove-tail-shaped grooves 26 in its face. Strips 27 of steel or other material of high resistance to heat, corrosion and oxidation are embedded in the recesses and securely fastened to the piston head by means of rivets 28.

What I claim as new and desire to secure by Letters Patent of the United States is:

1. A combustion engine piston having a face with a spiral groove, and a strip of material of high resistance to heat and oxidation wound into and held in intimate thermal contact with the groove to protect the face against heat and oxidation during operation.

2. A combustion engine piston composed of a metal which will oxidize and corrode to a relatively large degree under an application of heat, a material which has a relatively high resistance to oxidation and corrosion under an application of heat embedded and securely held by protruding portions of the metal of said piston between adjacent portions of said material in a surface of said piston which is exposed to heat during operation, said material and said protruding portions forming a substantially level surface a considerable area of which is composed of said material.

3. A combustion engine piston composed of a metal which will oxidize and corrode to a relatively large degree under an application of heat, a portion of said piston which is subjected to heat during operation having a groove in its surface, strip material which has a relatively high resistance to oxidation and corrosion securely held in intimate thermal contact in said groove by protruding portions of said metal between adjacent portions of said strip material, said protruding portions and said strip material forming a substantially level surface a considerable area of which is composed of said strip material.

4. A combustion engine piston composed of a metal which will oxidize and corrode to a relatively large degree under an application of heat, a portion of said piston which is subjected to heat during its operation having a plurality of grooves in its surface, strip material having a relatively high resistance to oxidation and corrosion securely held in intimate thermal contact in said grooves by protruding portions of said metal between adjacent portions of said strip material, said protruding portions and said strip material forming a substantially level surface a considerable area of which is composed of said strip material.

5. A machine element composed of a metal which will oxidize and corrode to a relatively large degree under an application of heat, a portion of said element which is subjected to heat during operation having a groove in its surface, strip material which has a relatively high resistance to oxidation and corrosion securely held in intimate thermal contact in said groove by protruding portions of said metal between adjacent portions of said strip material, said protruding portions and said strip material forming a substantially level surface a considerable area of which is composed of said strip material.

JOHN T. H. DEMPSTER.